(12) United States Patent
Joshi et al.

(10) Patent No.: US 10,731,570 B2
(45) Date of Patent: Aug. 4, 2020

(54) REDUCING AN ACOUSTIC SIGNATURE OF A GAS TURBINE ENGINE

(71) Applicant: PRATT & WHITNEY CANADA CORP., Longueuil (CA)

(72) Inventors: Ninad Joshi, Brampton (CA); Sid-Ali Meslioui, Brossard (CA); Tony Yee, Brossard (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 343 days.

(21) Appl. No.: 15/609,875

(22) Filed: May 31, 2017

(65) Prior Publication Data

US 2018/0347475 A1 Dec. 6, 2018

(51) Int. Cl.
| F02C 9/26 | (2006.01) |
| F02C 9/44 | (2006.01) |
| F02C 9/32 | (2006.01) |
| B64D 31/06 | (2006.01) |
| F02C 9/28 | (2006.01) |

(52) U.S. Cl.
CPC ............... *F02C 9/44* (2013.01); *B64D 31/06* (2013.01); *F02C 9/26* (2013.01); *F02C 9/263* (2013.01); *F02C 9/285* (2013.01); *F02C 9/32* (2013.01); *F05D 2220/323* (2013.01); *F05D 2260/96* (2013.01); *F05D 2270/08* (2013.01); *F05D 2270/14* (2013.01)

(58) Field of Classification Search
CPC .... F02C 9/44; F02C 9/26; F02C 9/263; F02C 9/285; F02C 9/32; F05D 2260/96; F05D 2270/08; F05D 2270/14

USPC ............................................................ 60/790
See application file for complete search history.

(56) References Cited

U.S. PATENT DOCUMENTS

| 3,520,133 A | * | 7/1970 | Loft | F02C 7/26 60/790 |
| 4,341,071 A | * | 7/1982 | Abo | F02C 9/28 60/39.281 |
| 4,378,673 A | * | 4/1983 | Abo | F02C 9/26 60/39.281 |
| 5,101,619 A | * | 4/1992 | Morris | F02C 7/26 60/778 |
| 5,907,949 A | * | 6/1999 | Falke | F02C 7/26 60/779 |

(Continued)

OTHER PUBLICATIONS

Warren, Chiristopher Niezrecki, et. al., Comparison of FRF measurements and mode shapes determined using optically image based, laser, and accelerometer measurements, Elsevier, Mechanical Systems and Signal Processing 25 (2011), pp. 2191-2202 (Year: 2011).*

*Primary Examiner* — Steven M Sutherland
(74) *Attorney, Agent, or Firm* — Norton Rose Fulbright Canada LLP

(57) ABSTRACT

Herein provided are methods and systems for reducing an acoustic signature of a gas turbine engine. An acceleration command for the engine is received. In response to receiving the acceleration command: a fuel flow to the engine is increased for a first predetermined time period; subsequent to the first predetermined time period, the fuel flow to the engine is reduced for a second predetermined time period; and subsequent to the second predetermined time period, the fuel flow to the engine is increased for a third time period.

17 Claims, 6 Drawing Sheets

(56) References Cited

U.S. PATENT DOCUMENTS

| | | | | |
|---|---|---|---|---|
| 6,148,603 A | * | 11/2000 | Althaus | F23R 3/28 |
| | | | | 60/39.465 |
| 8,239,114 B2 | * | 8/2012 | Goeke | F02C 9/285 |
| | | | | 701/100 |
| 9,556,799 B2 | | 1/2017 | Crothers et al. | |
| 2004/0154300 A1 | * | 8/2004 | Woltmann | F02C 7/22 |
| | | | | 60/725 |
| 2007/0119147 A1 | * | 5/2007 | Cornwell | F01D 17/02 |
| | | | | 60/39.281 |
| 2009/0133379 A1 | * | 5/2009 | Mendoza | F23N 5/00 |
| | | | | 60/39.281 |
| 2012/0102967 A1 | | 5/2012 | Kirzhner et al. | |

* cited by examiner time ->

REDUCING AN ACOUSTIC SIGNATURE OF A GAS TURBINE ENGINE

TECHNICAL FIELD

The present disclosure relates generally to gas turbine engines, and more particularly to fuel flow control for engines.

BACKGROUND OF THE ART

The designs of newer generations of gas turbine engines strive to reach increasingly stringent goals of emissions reduction. Whether the product of internal goals or environmental regulations, engine makers are working to deliver engines with ultra-low emissions, and which produce low levels of various combustion by-products. However, these new designs are prone to producing thermo-acoustic instabilities, sometimes referred to as "combustion instabilities". Combustion instabilities cause engines to produce high levels of noise, which can be discomforting for passengers, and in some cases can lead to engine durability issues.

The root causes of combustion instabilities are challenging to understand, as combustion instabilities can be the product of fuel-flow perturbations, flame thermodynamics, acoustic couplings between a combustor of the engine and various pipes and bleed ports, as well as other factors. Traditional attempts to address combustion instabilities centre around modifications to the structure of the engine or the use of various noise-mitigating add-on devices. Both of these techniques increase the weight and the complexity of the engine.

As such, there is room for improvement.

SUMMARY

In accordance with a broad aspect, there is provided a method for reducing an acoustic signature of a gas turbine engine. The method comprises receiving an acceleration command for the engine. In response to receiving the acceleration command, a fuel flow to the engine is increased for a first predetermined time period, subsequent to the first predetermined time period, the fuel flow to the engine is reduced for a second predetermined time period, and subsequent to the second predetermined time period, the fuel flow to the engine is increased for a third time period.

In accordance with another broad aspect, there is provided a system for reducing an acoustic signature of a gas turbine engine. The system comprises a processing unit and a non-transitory computer-readable memory communicatively coupled to the processing unit and comprising computer-readable program instructions. The instructions are executable by the processing unit for receiving an acceleration command for the engine, and in response to receiving the acceleration command, increasing a fuel flow to the engine for a first predetermined time period, subsequent to the first predetermined time period, reducing the fuel flow to the engine for a second predetermined time period, and subsequent to the second predetermined time period, increasing the fuel flow to the engine for a third time period.

In accordance with yet another broad aspect, there is provided a system for reducing an acoustic signature of a gas turbine engine. The system comprises at least one fuel flow valve configured for regulating a rate of fuel flow to the engine and a fuel flow control system communicatively coupled to the at least one fuel flow valve. The fuel flow control system controls operation of the at least one fuel flow valve by causing the fuel flow valve to increase the fuel flow rate for a first predetermined time period in response to receiving an acceleration command, subsequent to the first predetermined time period, causing the fuel flow valve to reduce the fuel flow rate for a second predetermined time period, subsequent to the second predetermined time period, causing the fuel flow valve to increase the fuel flow rate for a third time period.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
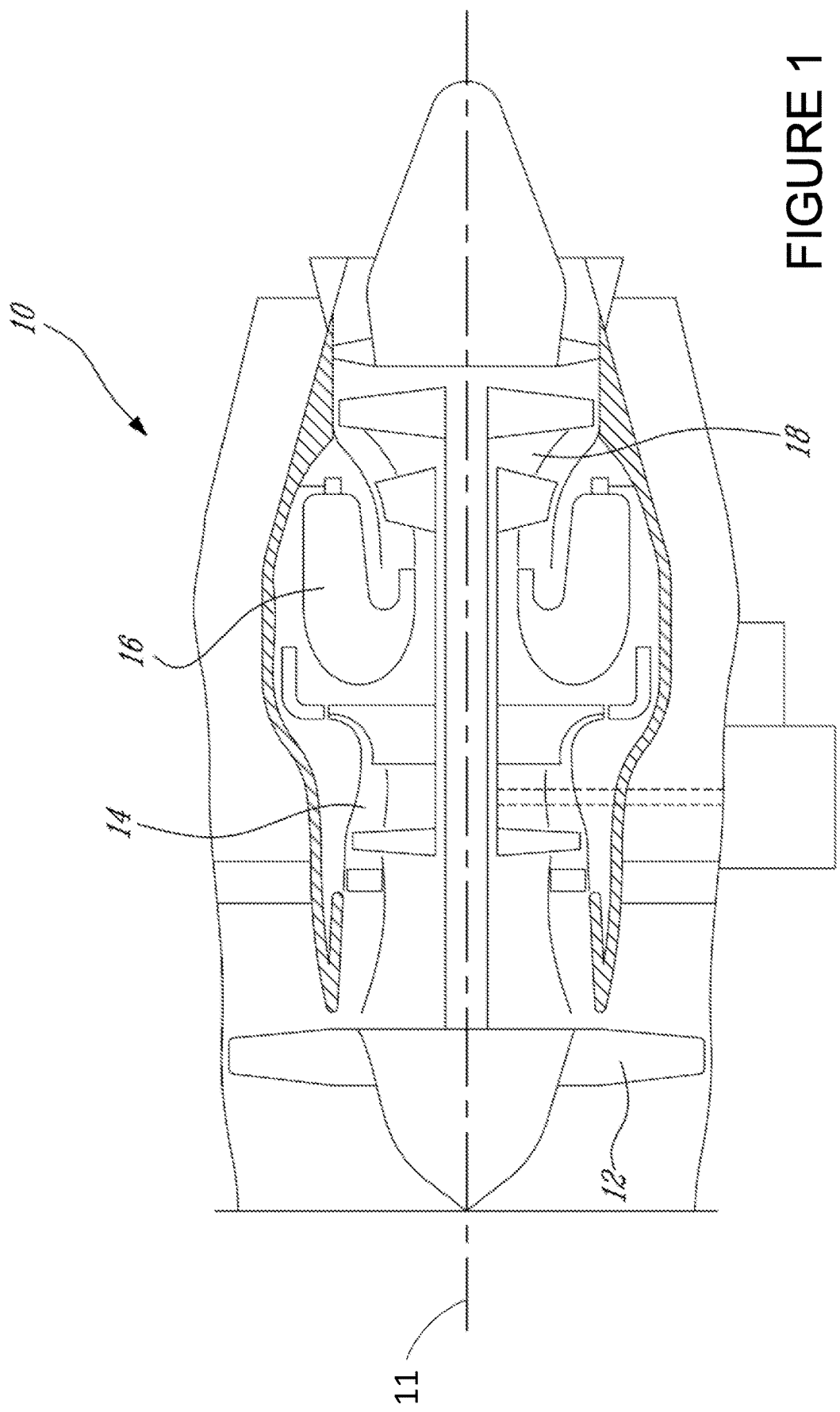
FIG. 1 is a schematic of an example gas turbine engine.

FIG. 1 illustrates a gas turbine engine 10 for which an acceleration schedule, which reduces an acoustic signature of the engine 10, may be set using the methods and systems described herein. Note that while engine 10 is a turbofan engine, the acceleration schedule setting methods and systems may be applicable to turboprop, turboshaft, auxiliary power units (APU), and other types of aircraft engines.

Engine 10 generally comprises in serial flow communication: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Axis 11 defines an axial direction of the engine 10.

Figure 2:
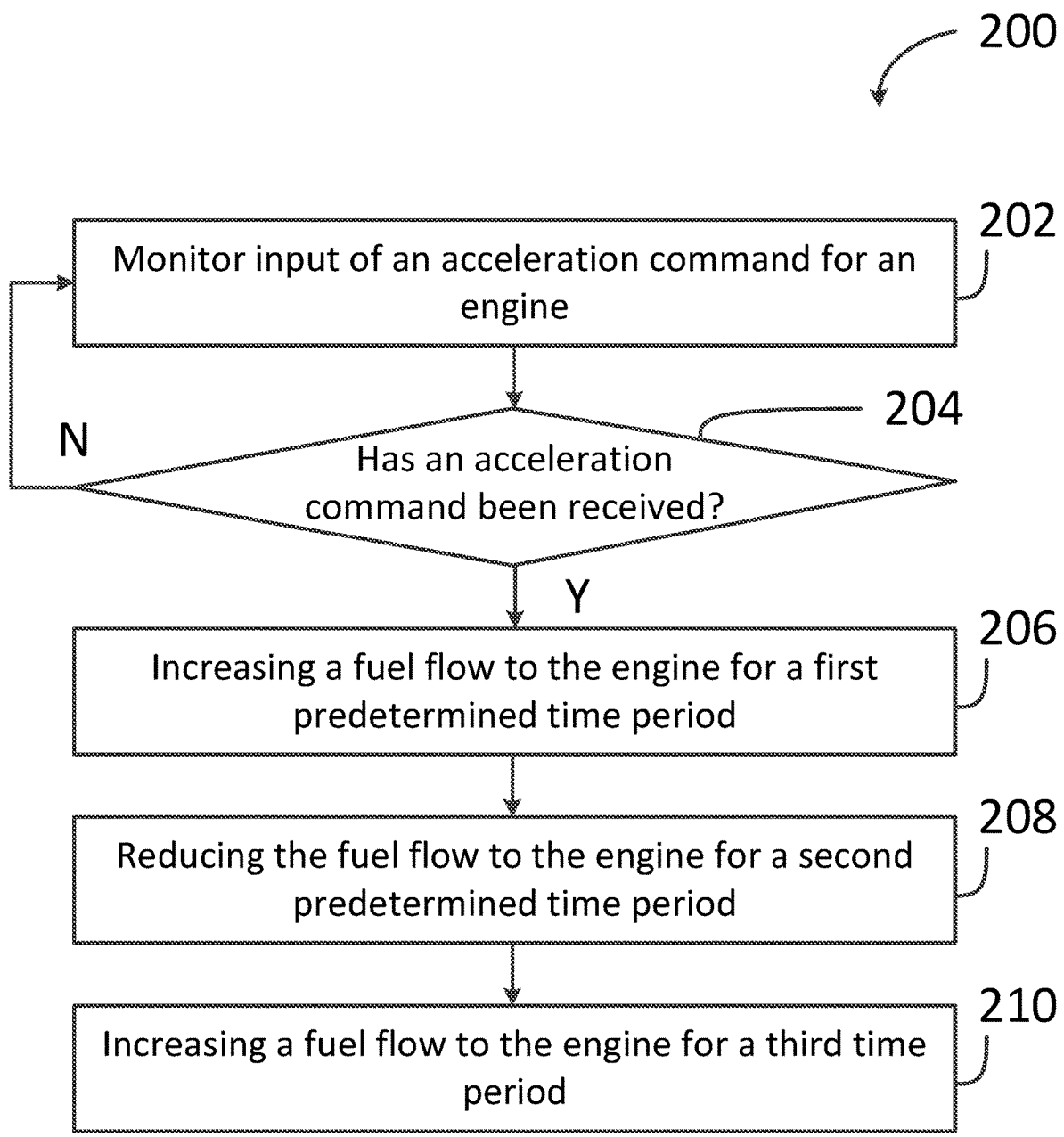
FIG. 2 is a flowchart illustrating an example method for reducing an acoustic signature of an engine.

With reference to FIG. 2, there is illustrated a flowchart of an example method 200 for reducing an acoustic signature of an engine, for example the engine 10 of FIG. 1. The method 200 is used to control the fuel flow to the engine 10 in accordance with a fuel flow schedule, which is described in greater detail hereinbelow. The fuel flow schedule, when implemented, produces an acceleration schedule for the engine 10.

At step 202, an input is monitored for receipt of an acceleration command for the engine 10. The acceleration command may be received as an electrical signal, for example when the engine 10 is controlled by a fly-by-wire system, via a mechanical input, or in any other suitable way. In some embodiments, the input is a digital signal sent by a flight control system and/or a cockpit control, for example a throttle lever. The acceleration command can be any suitable indication that acceleration of the engine 10 has been requested.

At decision step 204, a determination is made regarding whether an acceleration command has been received. If not, the method 200 returns to step 202. If so, the method 200 proceeds to step 206. It should be noted that step 206, as well as later steps 208 and 210, are performed in response to receiving the acceleration command.

In some embodiments, the received acceleration command indicates that the requested acceleration is from a ground idle state to a ground taxi state. The ground idle state is an engine state in which the engine 10 operates when an aircraft, to which the engine 10 belongs, is stationary on the ground, for example waiting at a gate. The ground taxi state is a state in which the engine 10 operates when the aircraft is moving along the ground, for example from a gate to a runway. In some such embodiments, the decision step 204 only proceeds to step 200 if the received acceleration command is a ground idle state to ground taxi state acceleration command. For example, if an acceleration command that indicates another type of requested acceleration is received (e.g. ground idle state to maximum takeoff state), the method 200 returns to step 202. In some embodiments, the engine 10 is then accelerated according to a separate, predetermined acceleration schedule for takeoff.

At step 206, a fuel flow to the engine 10 is increased for a first predetermined time period. In some embodiments, the fuel flow is increased in accordance with a flow schedule. For example, the fuel flow may be increased toward a maximum within a given delay. The fuel flow can be increased sharply or gradually, or along any suitable gradient. In addition, the first predetermined time period can have any suitable duration, including a few milliseconds, a few seconds, a few minutes, and the like. The fuel flow to the engine may be controlled via one or more valves, or via any other suitable control mechanism. For example, a valve is placed in a fuel path to the engine 10, and the valve is configured for being controlled via one or more electrical signals.

At step 208, the fuel flow to the engine 10 is decreased for a second predetermined time period subsequent to the first time period. In some embodiments, the fuel flow is reduced to a predetermined minimum level for the engine 10, or any other suitably reduced level. In other embodiments, the fuel flow is substantially cut, i.e. no fuel is allowed to flow to the engine 10. The fuel flow may be reduced in accordance with a flow schedule, for example toward the aforementioned minimum within a given delay. The fuel flow can be decreased sharply or gradually, or along any suitable gradient. In addition, the first predetermined time period can have any suitable duration, including a few milliseconds, a few seconds, a few minutes, and the like. In some embodiments, the second predetermined time period has about the same duration as the first predetermined time period. In other embodiments, the second predetermined time period has a duration which is longer or shorter than the first predetermined time period.

At step 210, the fuel flow to the engine 10 is increased for a third time period subsequent to the second time period. In some embodiments, the fuel flow is increased in accordance with a flow schedule. For example, the fuel flow may be increased toward a maximum within a given delay. In other embodiments, the fuel flow is continually increased, or is maintained at a predetermined level, until a subsequent acceleration command is received. The fuel flow can be increased sharply or gradually, or along any suitable gradient. In addition, the first predetermined time period can have any suitable duration, including a few milliseconds, a few seconds, a few minutes, and the like. In some embodiments, the third time period has a duration substantially equivalent to the duration of the first time period. In other embodiments, the third time period has a duration longer or shorter than the first time period. Additionally, the third time period may be shorter, longer, or substantially equivalent to the second time period.

Figure 3:
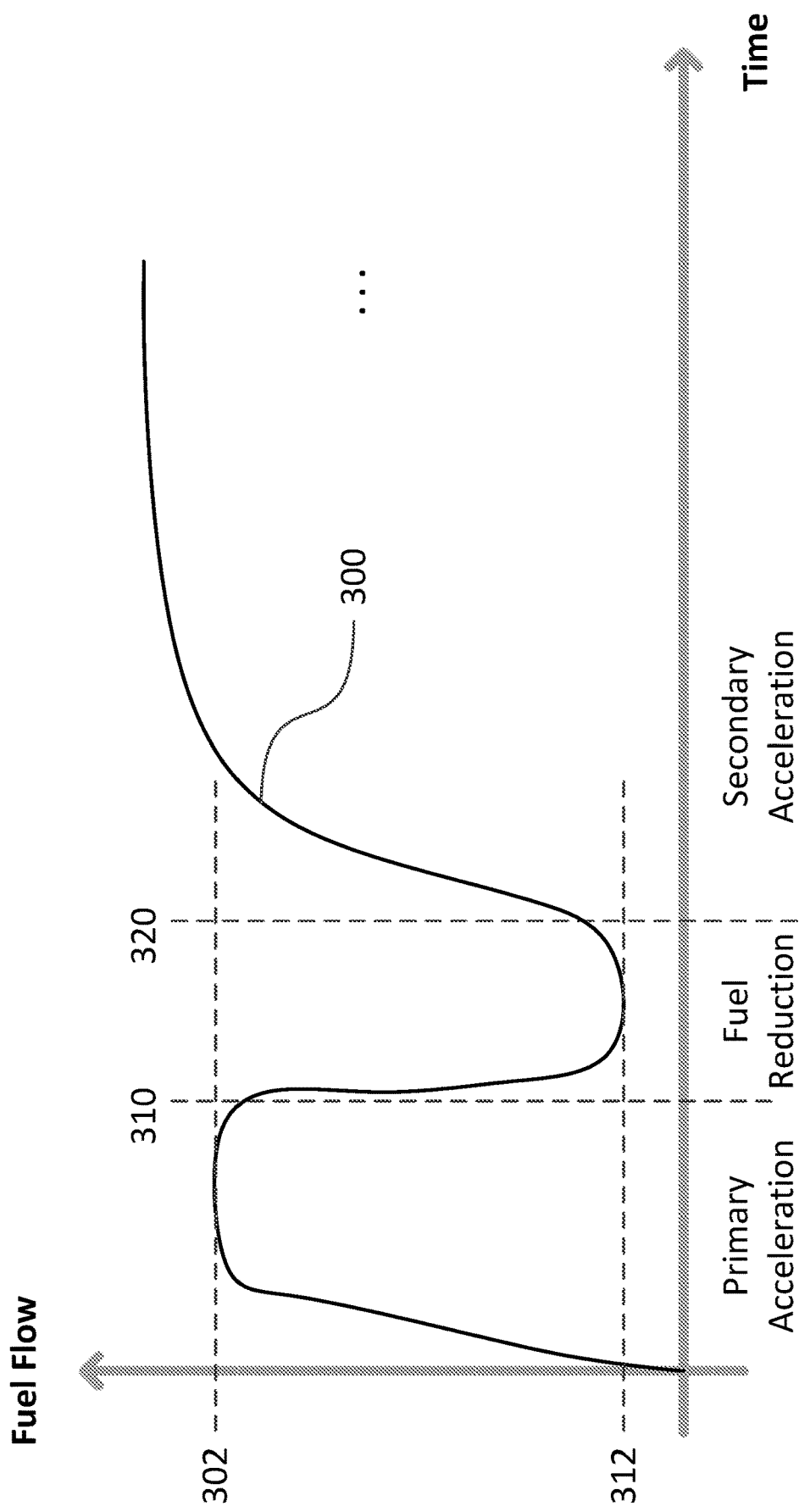
FIG. 3 is an example graphical representation of an engine fuel flow schedule.

With additional reference to FIG. 3, steps 206 through 210 of the method 200 provide a fuel flow schedule 300 which forms a "de-pulse" pattern. Although illustrated here as a fuel flow schedule, it should be noted that the fuel flow schedule 300 causes the engine 10 to be operated according to one or more associated acceleration schedules. In some embodiments, the fuel flow schedule 300 is associated with a single acceleration schedule. In other embodiments, the fuel flow schedule is associated with two or three acceleration schedules which are implemented subsequent to one-another. First, the engine 10 is accelerated by increasing the fuel flow to the engine 10 during a primary acceleration period, which beings at the start of the fuel flow schedule 300 until the end of the first time period, indicated by dashed line 310. The engine 10 is then decelerated (which may also be an acceleration at a reduced rate), by reducing the fuel flow to the engine 10 during a fuel reduction period, which follows the primary acceleration period and lasts until the end of the second time period, indicated by dashed line 320. The engine 10 is then accelerated again by increasing the fuel flow to the engine 10 during a secondary acceleration period, which follows the fuel reduction period and lasts for the third time period. In some embodiments, the third time period has a defined maximum or asymptote, and fuel is allowed to continue to flow indefinitely at the maximum level. In other embodiments, the third time period has a maximum allowable duration, at which point a different fuel flow schedule is applied to the engine 10.

In some embodiments, the primary acceleration period involves raising the fuel flow to a first level 302. The first level 302 can be any suitable fuel flow level, including a maximum fuel flow for the engine 10, when appropriate. In some embodiments, the fuel reduction period involves lowering the fuel flow to a second level 312. The second level 312 may be a minimum fuel flow for the engine 10, or may represent substantially cutting the fuel flow to the engine 10. In some embodiments, the secondary acceleration period involves raising the fuel flow to a third level equivalent to the first level 302. In other embodiments, the secondary acceleration period involves raising the fuel flow to the third level above the first level 302, or below the first level 302. Still other variations to the fuel flow schedule 300 are considered.

Figure 4A:
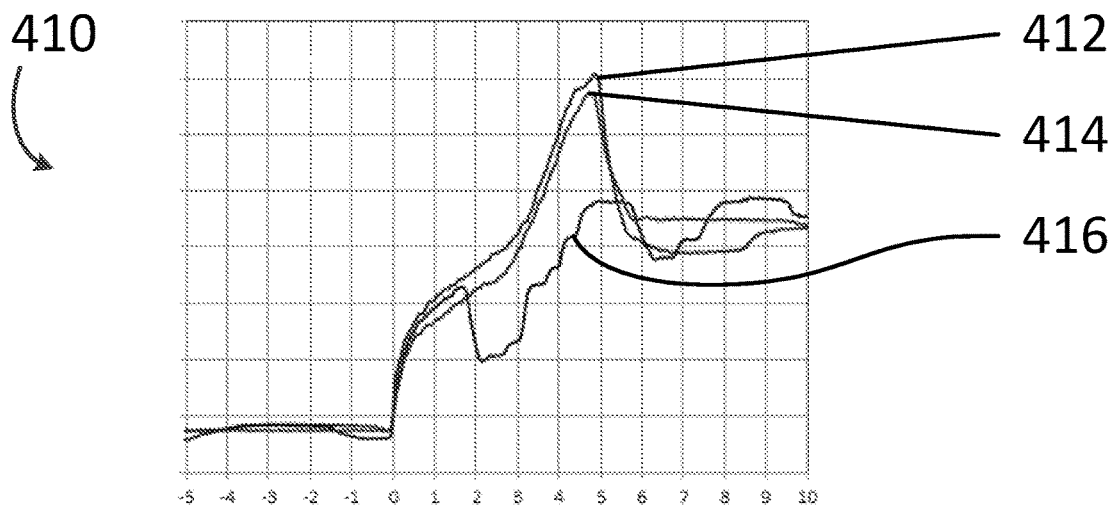
FIG. 4A is an example graphical representation of engine fuel flow.
Figure 4B:
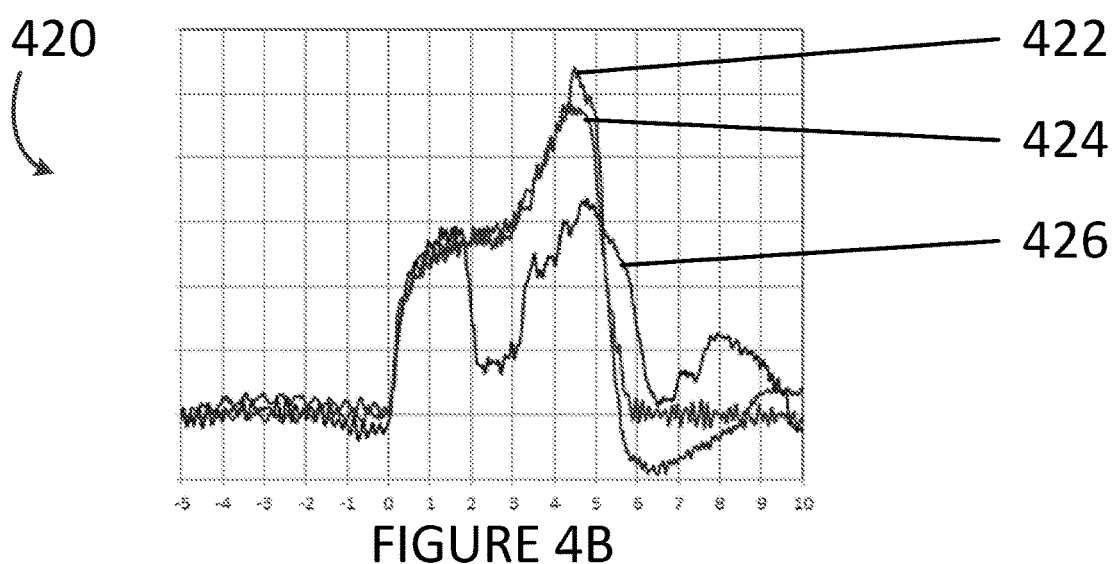
FIG. 4B is an example graphical representation of engine rotor acceleration level.
Figure 4C:
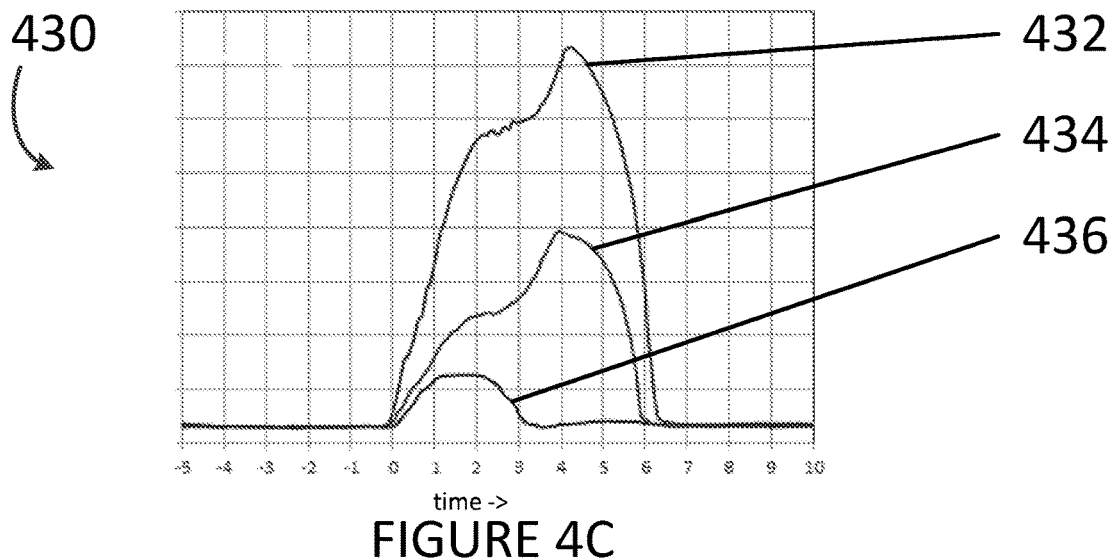
FIG. 4C is an example graphical representation of engine noise.

With reference to FIGS. 4A-C, there are shown three graphs illustrating experimental results for the de-pulse fuel flow schedule 300. In FIG. 4A, graph 410 illustrates three different fuel flow schedules 412, 414, and 416 for the engine 10. In FIG. 4B, graph 420 illustrates rotor acceleration levels 422, 424, 426 for the engine 10 when the fuel flow schedules 412, 414, and 416, respectively, of FIG. 4A are applied. In FIG. 4C, graph 430 illustrates sound profiles 432, 434, 436 for the engine 10 when the fuel flow schedules 412, 414, and 416, respectively, of FIG. 4A are applied. The sound profiles 432, 434, 436 are indicative of noise levels produced by the engine 10 when the various fuel flow schedules 412, 414, and 416 are implemented.

Fuel flow schedule 412 implements a standard acceleration schedule in which the fuel flow increases substantially continuously until a maximum. Rotor acceleration level 422, produced by applying the fuel flow schedule 412, results in a substantially continuous acceleration which produces a large sound profile 432. Fuel flow schedule 414 is a slightly reduced variant of the fuel flow schedule 412, wherein during the acceleration phase (from time 0 seconds to time 5 seconds), the fuel flow to the engine is reduced vis-à-vis the fuel flow schedule 412. When applied, the fuel flow schedule 414 produces rotor acceleration level 424, which in turn produces a reduced sound profile 434.

Fuel flow schedule 416 implements the de-pulse acceleration schedule described herein. The fuel flow is increased for a first time period, then decreased for a second time period, and then increased for a third time period. The fuel flow schedule 416, when implemented, produces the rotor acceleration level 426, which also exhibits a de-pulse shape. Additionally, the sound profile 436, produced by implementing the fuel flow schedule 416, is noticeably lower than the sound profiles 432 and 434. This indicates that the fuel flow schedule 416 produces lower noise levels than the standard fuel flow schedule 412 and the reduced fuel flow schedule 414.

Figure 5:
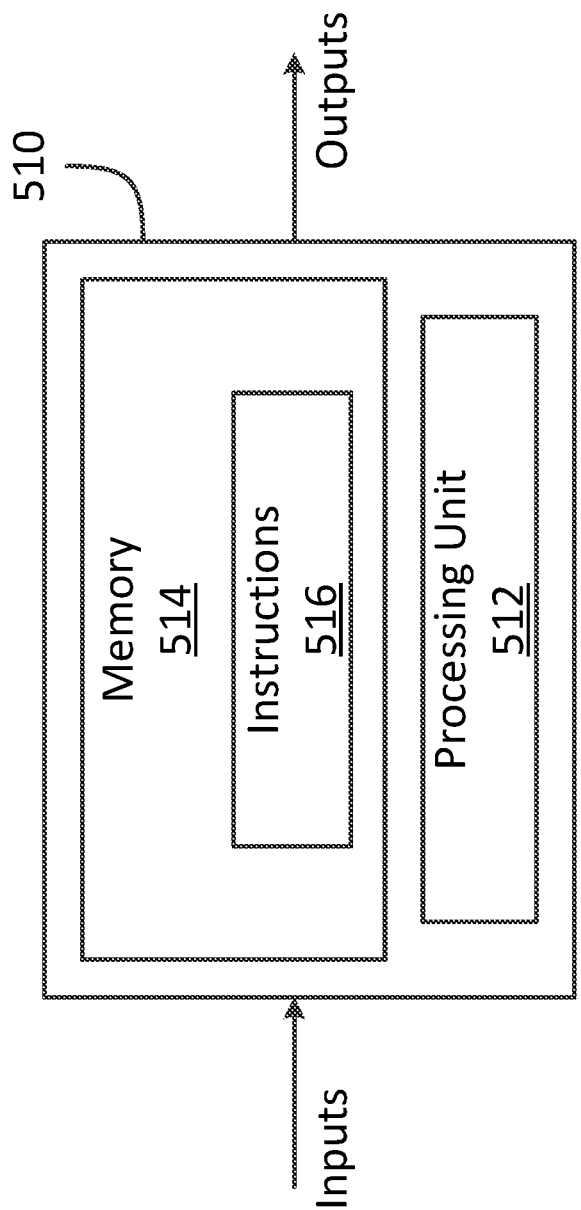
FIG. 5 is a block diagram of an example computer system for implementing the method of FIG. 2.

With reference to FIG. 5, the method 200 may be implemented by a computing device 510, comprising a processing unit 512 and a memory 514 which has stored therein computer-executable instructions 516. The processing unit 512 may comprise any suitable devices configured to implement the method 200 such that instructions 516, when executed by the computing device 510 or other programmable apparatus, may cause the functions/acts/steps performed as part of the method 200 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

Figure 6:
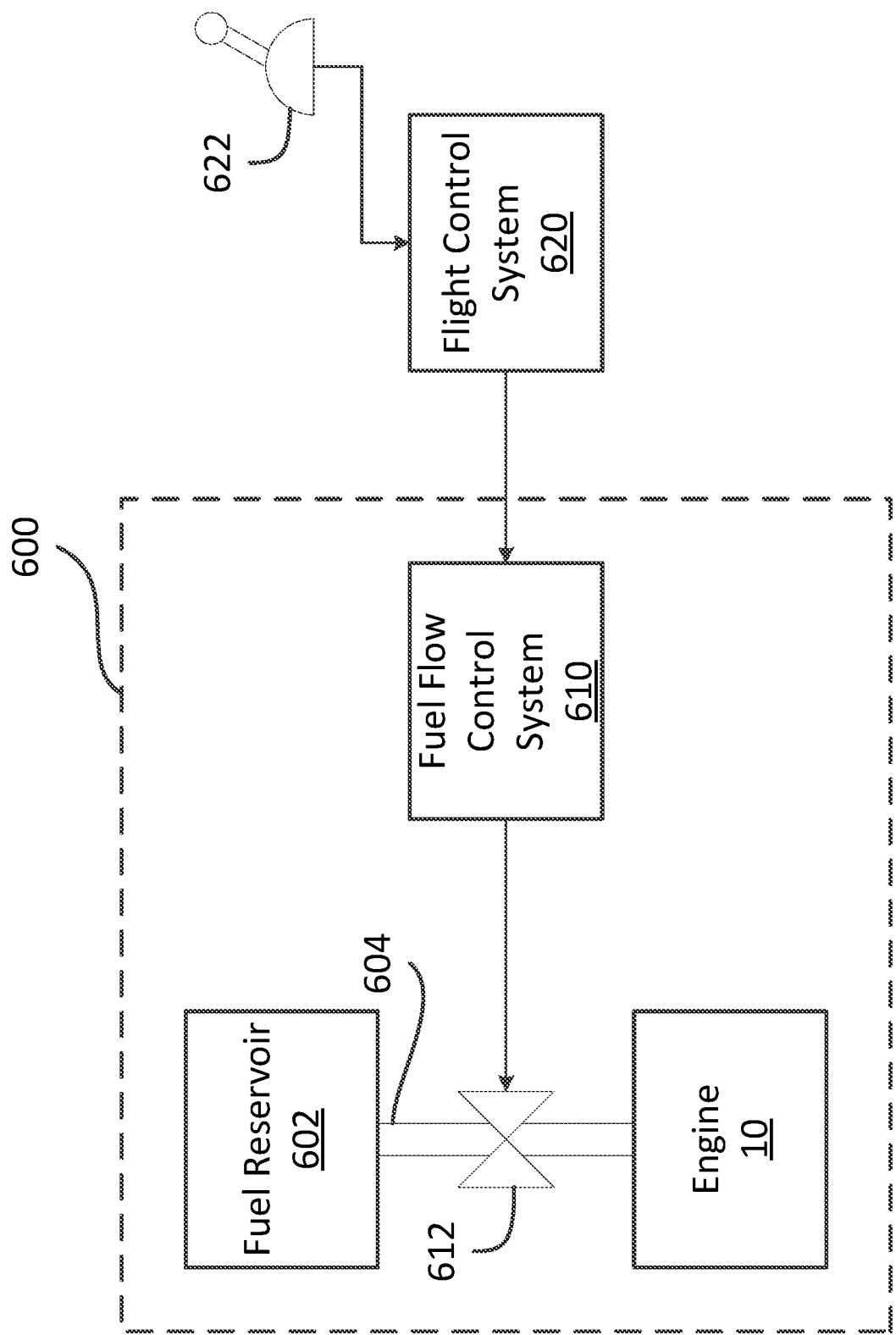
FIG. 6 is a block diagram of an example engine system.

With reference to FIG. 6, in some embodiments the engine 10 is part of an engine system 600 which also includes a fuel reservoir 602, a fuel delivery vector 604, a fuel flow control system 610, and a valve 612. The engine system 600 is configured for receiving inputs from a flight control system 620, which may originate from various flight controls, for example a throttle lever 622.

The fuel reservoir 602 can be any suitable container or tank used for the storage of fuel. In some embodiments, the fuel reservoir 602 is a fuel tank. The fuel reservoir 602 may contain any suitable type of fuel, including kerosene, naphtha-kerosene, avgas, compressed natural gas, liquefied natural gas, biofuels, and the like. The fuel reservoir 602 is fluidly coupled to the engine 10 via the fuel delivery vector 604, which may be one or more pipes, one or more tubes, or any other suitable delivery mechanism. The valve 612 can be any suitable type of valve for controlling the flow of fuel from the fuel reservoir 602 through the fuel delivery vector 604 to the engine 10.

The valve 612 is configured for being controlled by the fuel flow control system 610. In some embodiments, the fuel flow control systems 610 is configured to provide various control signals to the valve 612 which adjust the operation of the valve 612. For example, one or more wires communicatively couple the fuel flow control system 610 to the valve 612. In other embodiments, the fuel flow control system 610 operates one or more mechanical control devices which adjust the operation of the valve 612. Still other approaches for controlling the operation of the valve 612 are considered.

The fuel flow control system 610 may be implemented via the computing device 510, and may be configured for performing the method 200 for reducing the acoustic signature of the engine 10. The fuel flow control system 610 can monitor inputs from the flight control system 620 or from other sources, as per step 202. When an acceleration command is received, for example an acceleration command for accelerating from a ground idle state to a ground taxi state, the fuel flow control system 610 can implement steps 206 to 210 of the method 200. For example, the fuel flow control system 610 sends a first signal to the valve 612 to increase the fuel flow to the engine 10, as per step 206. After the first time period has elapsed, the fuel flow control system 610 sends a second signal to the valve 612 to reduce the fuel flow to the engine 10, as per step 208. After the second time period has elapsed, the fuel flow control system 610 sends a third signal to the valve 612 to increase the fuel flow to the engine 10, as per step 210.

Note that the fuel flow control system 610 can be implemented as part of a full-authority digital engine controls (FADEC) or other similar device, including electronic engine control (EEC), engine control unit (EUC), and the like.

The methods and systems for reducing an acoustic signature of an engine described herein may be implemented in a high level procedural or object oriented programming or scripting language, or a combination thereof, to communicate with or assist in the operation of a computer system, for example the computing device 510. Alternatively, the methods and systems for reducing an acoustic signature of an engine may be implemented in assembly or machine language. The language may be a compiled or interpreted language. Program code for implementing the methods and systems for reducing an acoustic signature of an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for reducing an acoustic signature of an engine may also be considered to be implemented by way of a non-transitory computer-readable storage medium having a computer program stored thereon. The computer program may comprise computer-readable instructions which cause a computer, or more specifically the processing unit 512 of the computing device 510, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for reducing an acoustic signature of an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for reducing an acoustic signature of a gas turbine engine, comprising:
   receiving an acceleration command for the gas turbine engine indicative of an acceleration from a ground idle state to a ground taxi state; and
   in response to receiving the acceleration command:
      increasing a fuel flow to the gas turbine engine for a first predetermined time period;
      subsequent to the first predetermined time period, reducing the fuel flow to the gas turbine engine for a second predetermined time period; and
      subsequent to the second predetermined time period, increasing the fuel flow to the gas turbine engine for a third time period.

2. The method of claim 1, wherein the acceleration command is a first acceleration command, further comprising, in response to receiving a second acceleration command indicative of an acceleration from a ground idle state to a takeoff state, increasing the fuel flow to the gas turbine engine in accordance with a predetermined acceleration schedule.

3. The method of claim 1, wherein reducing the fuel flow to the gas engine comprises substantially cutting off the fuel flow.

4. The method of claim 1, wherein increasing the fuel flow to the gas turbine engine for the first predetermined time period comprises increasing the fuel flow to a first level, and wherein increasing the fuel flow to the gas turbine engine for the third time period comprises increasing the fuel flow to the first level.

5. The method of claim 1, wherein increasing the fuel flow to the gas turbine engine for the first predetermined time period comprises increasing the fuel flow to a first level, and wherein increasing the fuel flow to the gas turbine engine for the third time period comprises increasing the fuel flow to a second level different from the first level.

6. The method of claim 5, wherein the first level is less than the second level.

7. The method of claim 1, wherein the second predetermined time period is of a shorter duration than the first predetermined time period.

8. The method of claim 1, wherein the third time period lasts until receipt of a subsequent acceleration command.

9. A system for reducing an acoustic signature of a gas turbine gas turbine engine, comprising:
   a processing unit; and
   a non-transitory computer-readable memory communicatively coupled to the processing unit and comprising computer-readable program instructions executable by the processing unit for:
      receiving an acceleration command for the gas turbine engine indicative of an acceleration from a ground idle state to a ground taxi state; and
      in response to receiving the acceleration command:
         increasing a fuel flow to the gas turbine engine for a first predetermined time period;
         subsequent to the first predetermined time period, reducing the fuel flow to the gas turbine engine for a second predetermined time period; and
         subsequent to the second predetermined time period, increasing the fuel flow to the gas turbine engine for a third time period.

10. The system of claim 9, wherein the acceleration command is a first acceleration command, the computer-readable program instructions being further executable for, in response to receiving a second acceleration command indicative of an acceleration from a ground idle state to a takeoff state, increasing the fuel flow to the gas turbine engine in accordance with a predetermined acceleration schedule.

11. The system of claim 9, wherein reducing the fuel flow to the gas turbine engine comprises substantially cutting off the fuel flow.

12. The system of claim 9, wherein increasing the fuel flow to the gas turbine engine for the first predetermined time period comprises increasing the fuel flow to a first level, and wherein increasing the fuel flow to the gas turbine engine for the third time period comprises increasing the fuel flow to the first level.

13. The system of claim 9, wherein increasing the fuel flow to the gas turbine engine for the first predetermined time period comprises increasing the fuel flow to a first level, and wherein increasing the fuel flow to the gas turbine engine for the third time period comprises increasing the fuel flow to a second level different from the first level.

14. The system of claim 13, wherein the first level is less than the second level.

15. The system of claim 9, wherein the second predetermined time period is of a shorter duration than the first predetermined time period.

16. The system of claim 9, wherein the third time period lasts until receipt of a subsequent acceleration command.

17. A system for reducing an acoustic signature of a gas turbine gas turbine engine, comprising:
   at least one fuel flow valve configured for regulating a rate of fuel flow to the gas turbine engine; and
   a fuel flow control system communicatively coupled to the at least one fuel flow valve for controlling operation thereof by:
      causing the at least one fuel flow valve to increase the fuel flow rate for a first predetermined time period in response to receiving an acceleration command indicative of an acceleration from a ground idle state to a ground taxi state;

subsequent to the first predetermined time period, causing the at least one fuel flow valve to reduce the fuel flow rate for a second predetermined time period; and subsequent to the second predetermined time period, causing the at least one fuel flow valve to increase the fuel flow rate for a third time period.

* * * * *